April 2, 1963 W. H. RAMBO ET AL 3,084,090
MACHINE AND METHOD FOR MANUFACTURE OF STRIP PLYWOOD
Filed March 16, 1959 3 Sheets-Sheet 1
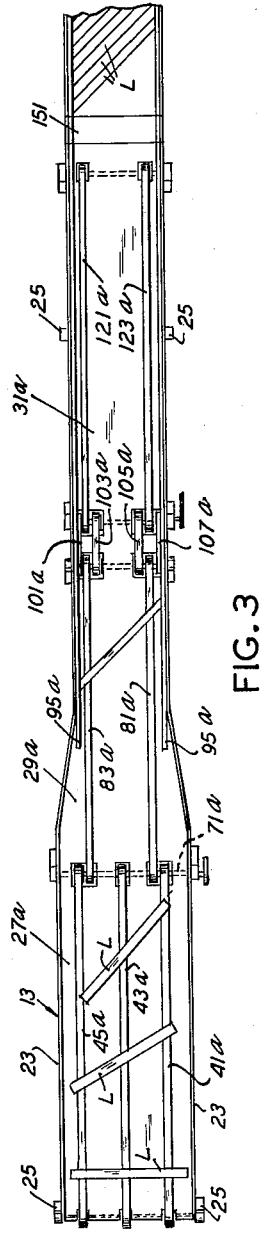
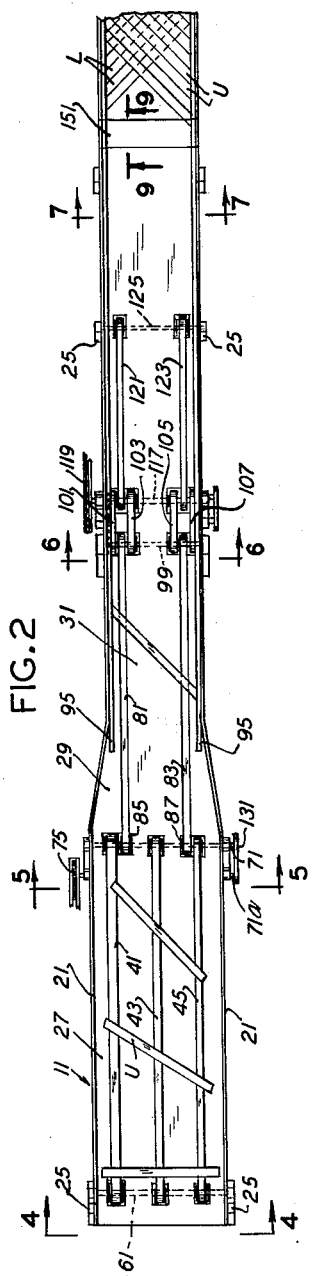
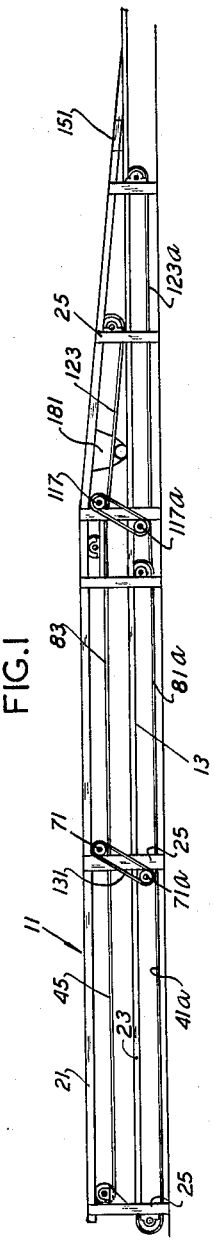
INVENTORS
WILLIAM H. RAMBO
ROBERT F. JOHNSON
BY
BUCKHORN CHEATHAM & BLORE
ATTORNEYS April 2, 1963   W. H. RAMBO ET AL   3,084,090
MACHINE AND METHOD FOR MANUFACTURE OF STRIP PLYWOOD
Filed March 16, 1959   3 Sheets-Sheet 2
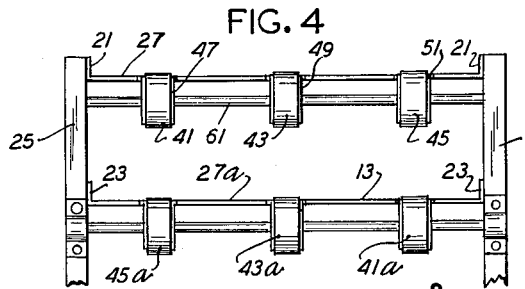
FIG. 4
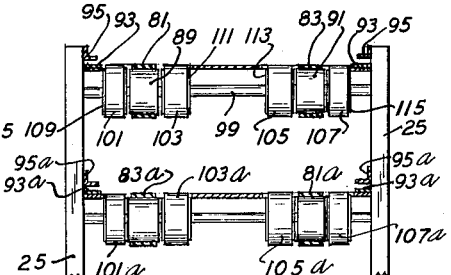
FIG. 6
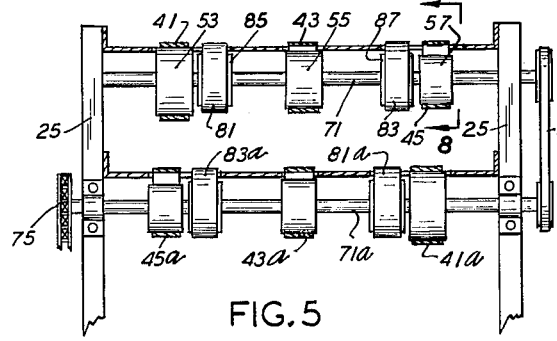
FIG. 5
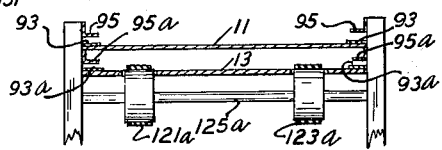
FIG. 7
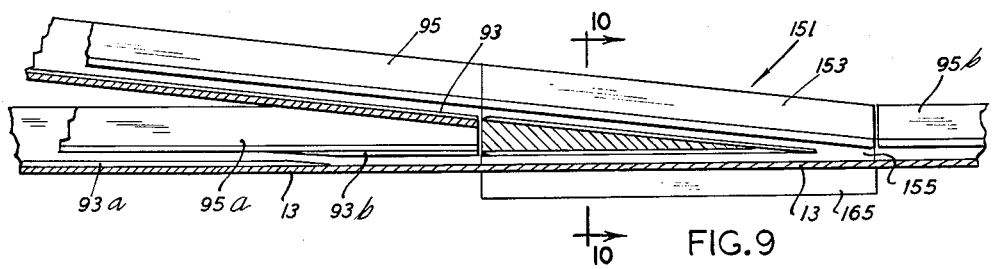
FIG. 9
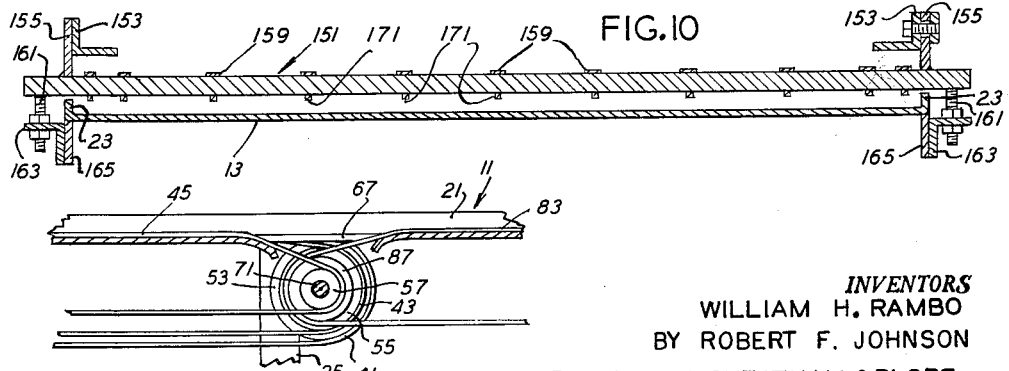
FIG. 10
FIG. 8
*INVENTORS*
WILLIAM H. RAMBO
BY ROBERT F. JOHNSON
BUCKHORN, CHEATHAM & BLORE
*ATTORNEYS*

April 2, 1963 W. H. RAMBO ET AL 3,084,090
MACHINE AND METHOD FOR MANUFACTURE OF STRIP PLYWOOD
Filed March 16, 1959 3 Sheets-Sheet 3
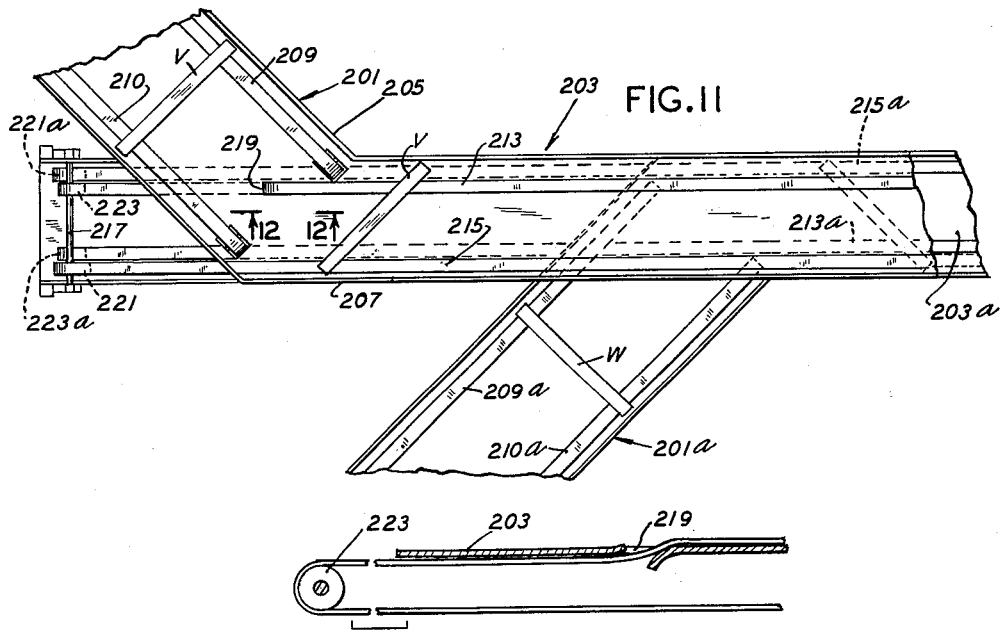
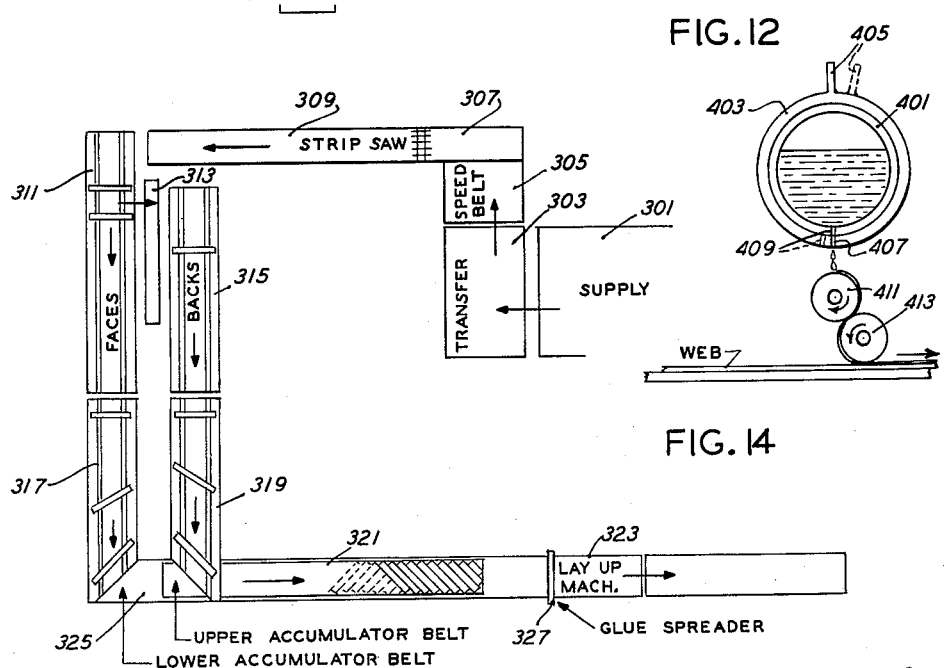
INVENTORS
WILLIAM H. RAMBO
BY ROBERT F. JOHNSON
BUCKHORN, CHEATHAM & BLORE
ATTORNEYS

United States Patent Office 3,084,090
Patented Apr. 2, 1963

3,084,090
MACHINE AND METHOD FOR MANUFACTURE OF STRIP PLYWOOD
William H. Rambo, 1890 SW. Vista Ave., Portland, Oreg., and Robert F. Johnson, 291 Fulcher Road, Las Vegas, Nev.
Filed Mar. 16, 1959, Ser. No. 799,591
9 Claims. (Cl. 156—299)

This invention relates to a machine and method for manufacturing plywood composed of strips of wood, and to the plywood product produced by such machine and method.

In the manufacture of plywood, a large number of pieces of veneer of narrow width or of unusable width are inadvertently produced in the various steps of peeling a log, clipping out the knots, and clipping the veneer to length. Heretofore, these pieces, or at least a considerable portion of such pieces, have been discarded as being useless.

It is a main object of the present invention to provide a machine for and a method of forming plywood panels from such pieces by assembling and securing together narrow width strips cut from such pieces.

Another main object of the invention is to provide a method and machine for continuously laying up plywood, both that made with a strip core and strip faces and that with a strip core and edge glued face or faces.

A further object of the invention is to provide a machine and method of securing the strips together in diagonal fashion relative to the edges of the panels for superior strength and improved appearance.

A further object of the invention is to provide an improved panel composed of diagonally arranged overlapped strips of uniform width.

Various other objects of the invention will be apparent from the following description taken in connection with the accompanying drawings wherein:

FIG. 1 is a side elevational view of a machine embodying the concepts of the present invention;

FIG. 2 is a plan view of the machine;

FIG. 3 is a plan view with the upper table removed to show the lower table;

FIG. 4 is an enlarged end view taken in the direction of the arrows 4—4 of FIG. 2;

FIG. 5 is an enlarged vertical sectional view taken along line 5—5 of FIG. 2;

FIG. 6 is an enlarged vertical section taken along line 6—6 of FIG. 2;

FIG. 7 is an enlarged vertical section taken along line 7—7 of FIG. 2;

FIG. 8 is a vertical section taken along line 8—8 of FIG. 5;

FIG. 9 is a sectional view taken along line 9—9 of FIG. 2, on a scale greater than that employed in FIGS. 4 through 8;

FIG. 10 is a sectional view taken along line 10—10 of FIG. 9;

FIG. 11 is a plan view of a modified form of the invention;

FIG. 12 is a vertical section taken along line 12—12 of FIG. 11;

FIG. 13 is a plan view of a still further modified form of the invention; and

FIG. 14 is a view in side elevation of a gluing mechanism.

*General Description*

The machine essentially comprises an upper elongated table 11 having a plurality of belts, to be described, for feeding a series of strips U of wood along and while so doing arranging the strips in a predetermined diagonal relation to the length of the table, and a lower elongated table 13 having a plurality of belts, to be described, for feeding a series of strips L of wood along and while so doing arranging the strips in a predetermined diagonal relation with respect to the length of the table but in crosswise relation with respect to the strips U on the upper table. A liquid adhesive material is applied to the upper surfaces of the lower series of strips, and the two tables converge together in a fashion such that the upper series of strips U is deposited onto the lower series of strips L in crosswise fashion to form a web. The strips are then pressed together and a cut-off mechanism, not shown, is provided for cutting off desired lengths of the web to form panels. The edges of these panels are trimmed to final dimension.

*Specific Description*

The upper table 11 has upright side flanges 21, as best shown in FIG. 4, and the lower table 13 has similar flanges 23, both tables being supported by a plurality of leg 25.

Referring to FIG. 2, the upper table has a wide portion 27 tapering at 29 to a narrow portion 31. The wide portion 27 has a width slightly exceeding the length of a strip U, and the strips are fed onto the table by any suitable mechanism, such as a belt conveyor, not shown, with the strips arranged in crosswise fashion to the length of the table. Receiving the strips are the upper reaches of three endless belts 41, 43 and 45 which are trained at their lefthand ends about three equal diameter pulleys 47, 49 and 51, respectively, as shown in FIG. 4 and trained at their righthand ends about three different diameter pulleys 53, 55 and 57 as shown in FIG. 5. The pulleys 53, 55 and 57 are driven, as will be explained, and these pulleys drive the belts and, incidentally, the pulleys 47, 49 and 51 at different speeds because of the different diameters of the pulleys 53, 55 and 57.

A freely rotatable shaft 61, as shown in FIG. 4, supports the pulleys 47, 49 and 51, the shaft being journaled on the associated legs 25 by means of bearings. Pulleys 49 and 51 are journaled by means of bearings on the shaft 61, but the pulley 47 is fixed to the shaft so that the pulley and shaft are driven by the belt 41. Thus, even though the pulleys 49 and 47 are not traveling at the same speed as pulley 51, because the pulleys are driven at different speeds through the belts by the different diameter pulleys 53, 55, and 57, the differences between the speeds of travel of the pulleys 49 and 47 and that of the shaft 61 are not great. Therefore, the wear on the pulley bearings is kept to a minimum.

The table 11 is formed with a slot or opening 67 for each pulley, as shown in the case of pulley 57 in FIG. 8, to enable the belts 41, 43, and 45 to pass through the table to dispose the upper reaches of the belts in sliding contact with the top surface of the table.

The three pulleys 53, 55, and 57 are fixedly mounted on a driving shaft 71, the shaft being supported by bearings on the associated legs 25. An end of shaft 71 is provided with a chain and sprocket assembly 75 to enable the shaft to be driven by a suitable source of power, such as an electric motor, not shown.

Pulley 53 is larger than pulley 55 and pulley 55 is larger than pulley 57, pulley 57 being the same diameter as pulleys 47, 49, and 51. For instance, pulley 53 might be 14 inches in diameter, pulley 55 might be 12 inches in diameter, and pulley 57 might be 10 inches in diameter. Since all the pulleys are driven by the common shaft 71, belt 41 is driven at a greater speed than belt 43 and belt 43 is driven at a greater speed than belt 45. For instance, the shaft 71 might be driven at such speed that belt 41 travels at 98 feet per minute, belt 43 at 84 feet per minute and belt 45 at 70 feet per minute. These are merely illustrative examples. This means that a strip U delivered to the left-hand end of the table 11 in crosswise relation to the table will be progressively moved from such crosswise position to the diagonal position for passage or travel onto a second bank of belts including a belt 81 and a belt 83.

The belts 81 and 83 are trained at their left-hand ends around pulleys 85 and 87, and at their right-hand ends around pulleys 89 and 91. The pulleys 85 and 87 are fixed to the shaft 71, the pulley 85 being the same diameter as pulley 57, but pulley 87 being slightly larger than pulley 57 as is evident from FIG. 5. Thus, belt 81 travels at the same speed as belt 45, but belt 83 travels at a slightly greater speed. For instance, pulley 85 may have a 10 inch diameter and pulley 87 an 11 inch diameter, giving a rate of travel of 70 feet per minute for belt 81 and 77 feet per minute for belt 83. Since belt 81 travels at a slower speed than belt 83, there is a tendency for these belts to turn a strip U in a counterclockwise direction and this functions to bring the ends of the strip against the upright side flanges 21 of the table 11 to hold all of the strips in a predetermined diagonal position.

To prevent the strips U from riding over one another as the strips progress along the machine, a special guide system has been provided beginning at the left-hand end of the narrow table portion 31.

Referring to FIG. 6, a narrow supporting strip 93 is provided along the narrow table portion 31 at each side thereof next to the associated side flange 31 and is secured to the table. These supporting strips are approximately the same thickness as the belts 81 and 83 so that a wooden strip U resting on the belts will have its end portions supported at the same level by the supporting strips 93. Above each supporting strip 93 is a guide member 95 secured to the associated side flange and spaced from the associated supporting strip 93 by a distance slightly greater than the thickness of a strip U. Referring to FIG. 2, the guide members 95 project to the left above the tapered table portion 29 for a short distance, as shown in FIG. 2, to readily receive the ends of the diagonally arranged strips U. Once a strip U enters between the strips 93 and guides 95 it is restrained from being shoved over or on top of a forward strip.

The pulleys 89 and 91 at the right hand ends of the belts 81 and 83 are of equal diameter and are equal to the diameter of the pulley 85 at the left-hand end of the belt 81. As shown in FIG. 6, the pulleys 89 and 91 are journaled by means of bearings on a supporting shaft 99. The shaft is journaled by means of bearings on the associated legs 25.

A third bank of belts is provided and includes four belts 101, 103, 105, and 107 driven at the same speed and trained at their left-hand ends about pulleys 109, 111, 113, and 115 as shown in FIG. 6. The latter-mentioned four pulleys are of equal diameter. The belts 101, 103, 105, and 107 are trained about similar pulleys at their right-hand ends mounted on a shaft 117. The pulleys on shaft 117 are also of equal diameter and equal to the diameter of the pulleys on the shaft 99. All the pulleys on shaft 99 are mounted by bearings on the shaft, whereas the pulleys on shaft 117 are fixed thereto.

The shaft 117 is driven by a sprocket 119 from a suitable source of motive power, such as an electric motor. It is apparent, therefore, that belts 101, 103, 105, and 107 are driven by means of the pulleys on the shaft 117. The shaft 117 is driven at a slower speed than the shaft 71 so that the speed of travel at the third bank of belts is less than the previous speed of travel of the belts, for instance, in the neighborhood of 50 feet per minute. This serves to crowd the diagonal strips together to make certain that there is a solid series of strips. The third bank of belts, as well as the fourth bank, to be described, may be considered as accumulator belts because of their action in crowding the strips together.

The fourth bank of belts includes a belt 121 and a belt 123 mounted at their left-hand ends on pulleys fixed to the shaft 117, and trained at their right-hand ends about pulleys mounted on a shaft 125. The belts 121 and 123 are driven at the same speed as belts 101, 103, 105, and 107 because the pulleys at the left-hand ends of the belts 121 and 123 are the same diameter as the remaining pulleys on the shaft 117.

Referring to FIG. 1, it is apparent that the table 11 commences to incline downwardly to the right, as the parts are shown in FIG. 1, toward the lower table just about at the location of the third bank of belts. The strips U leave the belts 121 and 123 and are merely shoved by following strips across the top surface of the narrow table portion 31 toward a combining zone to be described.

The lower table and associated mechanisms are very similar to the upper table and its associated mechanisms, but with several reversals of parts. For convenience, the reference numerals applied to the table 13 will be similar to those applied to table 11 except for the use of the subscript $a$ so that parts which generally correspond to one another will be readily recognized. The lower table 13 has a wide portion 27a, a tapering portion 29a, and a narrow portion 31a. Table 13 also has three belts 41a, 43a, and 45a at the forward portion 27a of the table, but these belts are so arranged that the strip L is turned in a counterclockwise direction by the belts instead of in a clockwise direction so that the strips L assume a diagonal position which is generally at right angles to the diagonal position into which the strips U are moved.

There is a second bank of belts 83a and 81a which are driven at slightly different speeds to move a strip L in a clockwise direction to cause the end portions thereof to bear against the side flanges 23 to dispose the strip L in a predetermined diagonal position.

There are also two guide members 95a for the narrow portions 31a of the table 13, and there is a third bank of belts 101a, 103a, 105a, and 107a to transfer the strips L from the second bank of belts to a fourth bank of belts 121a and 123a and effect an accumulation of the strips L. The belts 121a and 123a are longer than the belts 121 and 123 as is apparent by comparison of FIGS. 2 and 3. In fact, the belts 121a and 123a carry the strips very close to the combining or converging zone to be described.

There is a shaft 71a for the right-hand ends of the belts 41a, 43a, and 45a which is driven by a chain 131 from the shaft 71. There is also a shaft 117a driven by the shaft 117, the shaft 117a driving the third and fourth banks of belts.

*Combining Zone*

At the combining zone, there is a combining zone plate generally entitled 151 which is shown in plan in FIGS. 2 and 3 and is shown in side elevation in FIG. 1 and shown in section in FIGS. 9 and 10. The plate is rectangular in plan view but of narrow, triangular cross section, as clearly shown in FIG. 9. As shown in FIG. 9 the upper table 11 terminates at the combining plate 151, but the lower table 13 extends past and under the combining plate in spaced relation with respect thereto. However, the guide members 95a of the lower table 13 terminate at the combining plate 151, whereas the guide members 95 for the table 11, while terminating at the converging plate 151, have extension portions 153 forming a part of each side of the combining plate 151. The strips 93 associated with the guide members 95 terminate at the combining plate 151, while the strips 93a terminate in spaced relation to the plate 151 so that the strips L ride along the top surface of the table 13 at the time they reach the combining plate. Hold-down pieces 93b are provided on the lower faces of the guide members 95a just before the combining plate to assure that the strips L, leaving the supporting strips 93a, do not ride over one another.

As best shown in FIG. 10, the combining plate extends completely across the lower table 13, the side flanges 23 of the lower table being cut down as shown in FIG. 10 to accommodate the combining plate. Secured in upstanding relation adjacent the ends of the plate 151, as the parts are shown in FIGURE 10, are side flange members 155 forming, in effect, continuations of the side table flanges 21 and carrying the guide members 153. While the strips 93 terminate at the combining plate, a series of strips 159 secured to the top face of the combining plate 151, provide, in effect, continuations of the strips 93. The combining plate is supported by a pair of bolts 161 at each side thereof which bolts are secured to the plate and project through a pair of brackets 163 secured to depending side flanges 165 on the table 11.

The lower surface of the combining plate 151 carries a plurality of strips 171 extending longitudinally of the machine and, in fact, projecting beyond the right-hand edge of the combining member 151 and tapering to a point and being secured to projecting end portions of the strips 159, as is most clearly shown in FIG. 9. The strips 171 are spaced from the table 13 by a distance slightly greater than the thickness of a strip L, whereas the upper surfaces of the strip 159 are spaced from the guide pieces 153 by a distance slightly greater than the thickness of a strip U.

It is apparent from FIGS. 2, 3, and 10 that as the strips U from the table 11 leave the combining plate 151 they are laid in superposed relation on the strips L on the table 13 with the strips U disposed in oblique relation to the strips L. The web of strips thus formed travels away from the combining plate 151 along the table 13, being retained against the table with light pressure by guide members 95b which form an interrupted continuation of guide members 95a. The guide members 95b are spaced from the table 13 by a distance slightly exceeding the thickness of the web of strips.

A gluing mechanism at 181 is provided between the tables 11 and 13 and is operable to supply a layer of liquid adhesive material to the upper surfaces of the diagonal strips L riding along the lower table 13. Thus, when the upper strips U are laid upon the top surfaces of the lower strips L, the liquid adhesive material will serve to secure the strips together with the strips U arranged in transverse relation with respect to the strips L. A pressure assembly, not shown, is preferably provided in the form of rolls to press the strips together. A cut-off mechanism, not shown, is provided to cut the web of strips to desired length panels. Plywood panels may be readily formed by trimming the side edges of the panels thus provided.

*Modified Machines*

FIGS. 11 and 12 disclose the left-hand portion of a modified form of the machine. The right-hand end of the machine in FIGS. 11 and 12, although not being shown, is the same as the right-hand end of the machine disclosed in FIGS. 1, 2 and 3.

The machine disclosed in FIGS. 11 and 12 includes an upper table of angular form including a wide portion 201 obliquely intersecting a narrower portion 203, the table having side flanges 205 and 207. A pair of equal speed assemblies 209 and 210 feed strips V from the wide table portion 201 onto the narrow table portion 203. A belt assembly includes a belt, its pulleys and supporting shafts and a drive unit if one is required. The wide table portion has a width slightly exceeding the length of a strip V, whereas the width of the table portion 203 is such as to accommodate the strip V when the strip is disposed in the diagonal position shown in FIG. 9. The upper reaches of the belts 209 and 210 slide across the upper face of the wide table portion 201 and deposit the strips V onto the narrow table portion 203 in diagonal relation because of the oblique relationship of the wide table portion to the narrow table portion. The narrow table portion 203 has a pair of belts 213 and 215 driven by a common shaft 217. The upper reach of the belt 215 moves directly onto the upper surface of the narrow table portion 203 through an appropriate slot in the side flange 207, whereas the upper reach of the belt 213 is disposed beneath the left-hand end of the narrow table portion 203 and passes up onto the upper surface of the narrow table portion through a slot 219 in the manner best shown in FIG. 12. Thus, the left-hand portion of the upper reach of the belt 213 passes beneath the upper reach of the belt 210.

The left-hand pulley 221 for the belt 215 is larger than the left-hand pulley 223 for the belt 213 and both are mounted on and driven by the shaft 217 so that the belt 215 travels faster than the belt 213. The belts, therefore, urge the strips V on the narrow table portion 203 to turn in a counterclockwise direction to maintain the ends of the strips in engagement with the upstanding side flanges 205 and 207 of the upper table. This maintains the strips in the desired diagonal position.

Appropriate guides, not shown, such as disclosed in the first form of the invention, preferably are provided for the side flanges 205 and 207 to prevent the strips on the narrow table portion from riding over one another.

The upper table assembly is substantially duplicated by a lower table assembly except that the wide table portion 201a of the lower table assembly is disposed at right angles, or at least in oblique relationship, to the wide table portion 201 of the upper table. The wide table portion 201a of the lower table has an acute angle relationship with respect to its narrow table portion 203a. This assures that the strips W on the wide table portion 201a will be deposited in oblique relationship to the length of the narrow table portion 203a and that these strips W will be disposed in oblique relationship to the strips V on the upper table.

The wide table portion 201a is provided with equal speed belts 209a and 210a for feeding strips W onto the narrow table portion 203a. The upper reaches of the belts 209a and 210a slide across the upper face of the table 201a in the same manner as do the upper reaches of the belts 209 and 210 with reference to the table 201.

The narrow table portion 203a has a belt 213a and a belt 215a, with the belt 215a traveling at a greater speed than the belt 213a because the left-hand pulley 221a of the belt 215a is larger than the left-hand pulley 223a of the belt 213a. The left-hand pulleys of the belts 213a and 215a are supported on a shaft, not shown, which is disposed beneath the driven shaft 217.

FIG. 13 shows, diagrammatically, a modified form of the invention in which there is a supply conveyer 301 supplying veneer sheets or veneer pieces to a transfer conveyer 303, a speed belt arrangement 305 feeding the sheets or pieces to a gang saw 307 which saws the sheets and pieces into strips of uniform width. There is a conveyer 309 which feeds the strips to a conveyer 311, and a conventional take-off unit 313 takes strips from the conveyer 311 and supplies them to a conveyer 315. The strips on the conveyer 315 may be considered as backing strips and the ones left on the conveyer 311 as face strips. The conveyer 311 feeds the strips to a second conveyer 317 having belts running at different speeds to impart a counterclockwise movement to the face strips to dispose them in diagonal relationship to the length of the conveyer table 317. There is a conveyer 319 having different speed belts for taking the strips from conveyer 315 and urging the strips to move in a clockwise direction so that the strips are disposed in an oblique relationship to the length of the conveyer 319 and also in oblique relationship to the strips on the conveyer 317. An upper accumulator conveyer 321 takes the backing strips and feeds them along to a lay-up machine 323 which comprises the right-hand end of the machine disclosed in FIGS. 1, 2 and 3. There is a lower conveyer 325 taking the strips from conveyer 317 and also feeding them to the lay-up machine which, of course, contains a combining plate as in the first form of the invention. There is, of course, a glue spreader 327 as in the first form of the invention. The conveyers 321 and 325 will have belts moving at slightly different speeds to exactly orient the strips received from the conveyers 317 and 319 by urging the strips against upright side flanges, not shown, of the conveyers, as in the first form of the invention.

While the invention has been described in connection with forming a web of two layers or plies thick, the invention is not intended to be so limited since by adding one or more flights to an existing machine, one or more plies or layers may be added to form a board having a plurality of plies or layers. In such a machine, a web two plies or layers thick could be formed as indicated in the drawings and description, and then an extra ply or layer added by an upper flight fed onto the two ply or layer web by means of a combining member similar to member 151. It is further apparent that two webs, each of which is two plies or layers thick, could be combined by utilizing a combining member similar to member 151. In fact, webs of several or more plies or layers each could be combined.

In such a multiple ply or layer web, the individual strips or boards or an extra ply could extend longitudinally or transversely with respect to the length of the board to be formed, or have an oblique relationship with respect to such length. In any such multiple ply or layer setup, there would, of course, be an adhesive applicating mechanism to apply a layer of adhesive between each adjacent pair of webs.

FIG. 14 shows a gluing mechanism that might be utilized in the machine of the present invention. The gluing mechanism includes an inner tubular member 401 and an outer tubular member 403 which may be turned realtive to the inner member by an arm mechanism generally indicated at 405 so that a series of holes 407 in the outer tube are moved from a position in register with a series of holes 409 in the inner tube to a position out of register. This cuts off the supply of glue. Liquid adhesive material is supplied to the interior of the tubular member 401 from a source not shown.

Beneath the tubular members 401 and 403 is a roll 411 upon which the adhesive material falls. The roll 401 is driven in a clockwise direction as the parts are viewed in FIG. 14 to carry the adhesive material around to a second roll 413 which is disposed in contiguous relation with respect to roll 411. Roll 413 moves in a counterclockwise direction so that a film of adhesive material is carried by the roll 413 down onto the web W. The web may be a series of strips making up one ply of a multi-ply web or it may be several plies thick. The roll 413 therefore applies the liquid adhesive material to the web as in the form of a desired thickness film, therefore decreasing the likelihood of filling up the recesses or openings in any of the portions of the web. Application of too much glue might allow the glue to fill up a hole and thus leave excess glue around which could be picked up by surfaces over which the web travels and thus impair the operation of the machine.

The arrangement set forth in FIG. 14 is especially suitable for machines designed for intermittent operation. In a continuously operating machine, a flying saw of conventional form could be utilized to cut off the web in desired length sections. However, if intermittent operation of the machine is desired, a standard transversely movable saw could be utilized and during the momentary period of rest of the machine, the gluing mechanism disclosed in FIG. 14 could be operated to cut off the flow of adhesive material to the roll 411 and therefore avoid a pile-up of adhesive material on the roll. It is therefore apparent that the machine of the present invention is suited for either continuous operation or for intermittent operation.

A machine embodying the concepts of the present invention could also be utilized for making standard plywood suitable for interior use rather than merely for rough sheathing. It is common knowledge that in recent years, a practice has developed of forming a continuous strip of facing veneer approximately 8 feet wide by edge gluing sections of veneer after the veneer is run through a suitable clipper. Thereafter, it is common practice to cut the continuous facing sheet or strip at approximately 4 foot intervals, to provide a facing ply for laying on a core to produce a standard 4 by 8 feet piece of plywood.

A machine of the present invention for producing plywood suitable for interior use or exterior use where appearance is important, can be provided to produce the plywood in continuous fashion by forming a multiple ply plywood with the core consisting of upper and lower layers of strips as produced by the machine of FIGS. 1, 2 and 3, and then applying a long strip or sheet of edge glued facing veneer to the web thus produced with the use of a combining plate and an auxiliary gluing mechanism. A suitable backing face could be provided for the core by utilizing a continuous edge glued backing strip. A combining plate and gluing mechanism would also be used in connection with the backing sheet or strip. The thus devised machine would therefore produce plywood in a continuous fashion and the plywood would have a facing of high quality.

It is contemplated that a long length of edge glued facing material could be wound around a suitable roll and unrolled therefrom onto a lattice web produced by the machine of FIGS. 1, 2 and 3. A similar roll of edge glued backing veneer could be employed for employing a backing to the lattice core web. In making standard panels of plywood, such as 4 by 8 feet, the machine of FIGS. 1, 2 and 3 would have a width slightly greater than 8 feet so that the web was slightly greater than 8 feet wide. The edge glued facing strip, which conventionally is 8 feet wide, could then be applied readily to the 8 foot web. A cut-off mechanism would then cut the thus formed panel material at 4 foot intervals to produce 4 by 8 feet plywood panels.

It is obvious that the width of the machine in FIGS. 1, 2 and 3 could be altered so that plywood panels of any suitable size and shape could be formed.

Instead of a liquid adhesive, an adhesive in the form of powder or in the form of a sheet of adhesive material could be employed. In such instance, sections could be cut from the web and placed, for instance, in a hot press to render the adhesive material flowable so that a proper bond between the various plies or layers could be achieved.

Having described the invention in what is considered to be the preferred embodiment thereof, it is desired that it be understood that the invention is not to be limited other than by the provisions of the following claims.

We claim:

1. A machine for assembling strips of material to form a two layer web comprising mechanical means for moving a first series of strips along a predetermined path with the strips arranged obliquely to such path and in contiguous relation to one another, mechanical means for moving a second series of strips along a predetermined path with the strips arranged obliquely to the latter path and in contiguous relation to one another, said latter path converging with respect to the first-named path to provide a converging zone, and means operable as the strips move along and past such converging zone for arranging the strips of one series against strips of the other series, said mechanical means serving to arrange said strips so that the strips of one series are obliquely arranged relative to the strips of the other series, and means for applying an adhesive material to at least one series of strips on the face of said strips which engages the other series of strips at a time prior to such strips reaching said converging zone.

2. A machine for assembling strips of material to form a two layer web comprising mechanical means for moving a first series of strips along a predetermined path, with the strips arranged crosswise relative to such path and for altering the orientation of such strips until they are obliquely arranged relative to such path and in contiguous relation with respect to one another, mechanical means for moving a second series of strips along a predetermined path with the strips arranged crosswise relative to such path and for altering the orientation of such strips until they are obliquely arranged relative to such path and in contiguous relation to one another, the latter path converging with respect to the first-named path to provide a converging zone, and means operable as the strips move along and past such converging zone for arranging the strips of one series against the strips of the other series.

3. A machine for assembling strips of material to form a two layer web comprising mechanical means for moving a first series of strips along a predetermined path, with the strips arranged crosswise relative to such path and for altering the orientation of such strips until they are obliquely arranged relative to such path and in contiguous relation to one another, mechanical means for moving a second series of strips along a predetermined path with the strips arranged crosswise relative to such path and for altering the orientation of such strips until they are obliquely arranged relative to such path and in contiguous relation to one another, the latter path converging with respect to the first-named path to provide a converging zone, and means operable as the strips move along and past such converging zone for arranging the strips of one series against the strips of the other series, said mechanical means serving to arrange the strips of one series in oblique relation to the strips of the other series.

4. A method of assembling strips of material into a two layer web comprising the steps of moving a first series of strips along a predetermined path, moving a second series of strips along a predetermined path which converges toward the first-mentioned path, arranging the strips of each series in oblique relation to its path and in contiguous relation to the strips of its series with the strips of one series obliquely arranged with respect to the strips of the other series at the convergence of such paths, and combining the strips at the convergence of such paths to provide a web of strips.

5. A method of forming plywood in continuous fashion comprising the steps of moving a first series of strips along a predetermined path, moving at least a second series of strips along a predetermined path which converges toward the first-mentioned path, arranging the strips of each series in oblique relation to the strips of the other series and in contiguous relation to one another, combining the strips at the convergence of such paths to provide a web of strips, applying adhesive material to at least one of the series of strips prior to the converging zone, and effecting a bond between the strips of one layer with the strips of the other layer through the medium of such adhesive material after said strips have been combined at the convergence zone, and securing a long length of edge glued veneer ply to one side of the web of strips after the web is formed.

6. A machine for assembling strips of material to form a two layer web comprising mechanical means for moving a first series of strips along a predetermined path, mechanical means for moving a second series of strips along a predetermined path, the latter path converging with respect to the first-named path to provide a converging zone, and means operable as the strips move along and past such converging zone for arranging the strips of one series against strips of the other series, means for maintaining said strips in oblique relation to such paths and in contiguous relation to one another, said maintaining means including conveying means driven at different speeds and guide means for engaging the ends of the strips.

7. A machine for assembling strips of material to form a two layer web comprising mechanical means for moving a first series of strips along a predetermined path, mechanical means for moving a second series of strips along a predetermined path, the latter path converging with respect to the first-named path to provide a converging zone, and means operable as the strips move along and past such converging zone for arranging the strips of one series against strips of the other series, means for maintainnig said strips in oblique relation to such paths in contiguous relation to one another, said maintaining means including conveying means driven at different speeds and guide means for engaging the ends of the strips, said conveying means urging said strips against said guide means and said guide means including guide members spaced from one another by a distance less than the length of a strip.

8. A machine for assembling strips of material to form a two layer web comprising mechanical means for moving a first series of strips along a predetermined path, mechanical means for moving a second series of strips along a predetermined path, the latter path converging with respect to the first-named path to provide a converging zone, and means operable as the strips move along and past such converging zone for arranging the strips of one series against strips of the other series, said mechanical means serving to arrange said strips so that the strips of one series are obliquely arranged relative to the strips of the other series, and means for applying an adhesive material to at least one series of strips on the face of said strips which engages the other strips and before the strips are combined into said web, means for maintaining said strips in oblique relation to such paths in contiguous relation to one another, said maintaining means including conveying means driven at different speeds and guide means for engaging the ends of the strips.

9. A machine for assembling strips of material to form a two layer web comprising mechanical means for moving a first series of strips along a predetermined path, mechanical means for moving a second series of strips along a predetermined path, the latter path converging with respect to the first-named path to provide a converging zone, and means operable as the strips move along and past such converging zone for arranging the strips of one series against strips of the other series, said mechanical means serving to arrange said strips so that the strips of one series are obliquely arranged relative to the strips of the other series, and means for applying an adhesive material to at least one series of strips on the face of said strips which engages the other strips and before the strips are combined into said web, means for maintaining said strips in oblique relation to such paths and in contiguous relation to one another, said maintaining means including conveying means driven at different speeds and guide means for engaging the ends of the strips, said conveying means urging said strips against said guide means and said guide means including guide members spaced from one another by a distance less than the length of a strip.

References Cited in the file of this patent

UNITED STATES PATENTS

| | | | |
|---|---|---|---|
| 1,058,701 | Mutter | Apr. 8, | 1913 |
| 1,192,832 | Sherman | July 25, | 1916 |
| 1,394,726 | Gilmore | Oct. 25, | 1921 |
| 2,291,651 | Robinson | Aug. 4, | 1942 |
| 2,323,105 | Welch | June 29, | 1943 |
| 2,490,819 | Lambert et al. | Dec. 13, | 1949 |
| 2,578,781 | Brundige | Dec. 18, | 1951 |
| 2,586,473 | Mead | Feb. 19, | 1952 |
| 2,729,584 | Foster | Jan. 3, | 1956 |
| 2,751,946 | Gramelspacher | June 26, | 1956 |
| 2,951,779 | Mackey et al. | Sept. 6, | 1960 |